Jan. 19, 1926.　　　　　　　　　　　　　　　1,570,452
N. P. SJOBRING ET AL
ADJUSTING MEANS FOR ROLLERS
Filed Feb. 18, 1924　　　　3 Sheets-Sheet 3
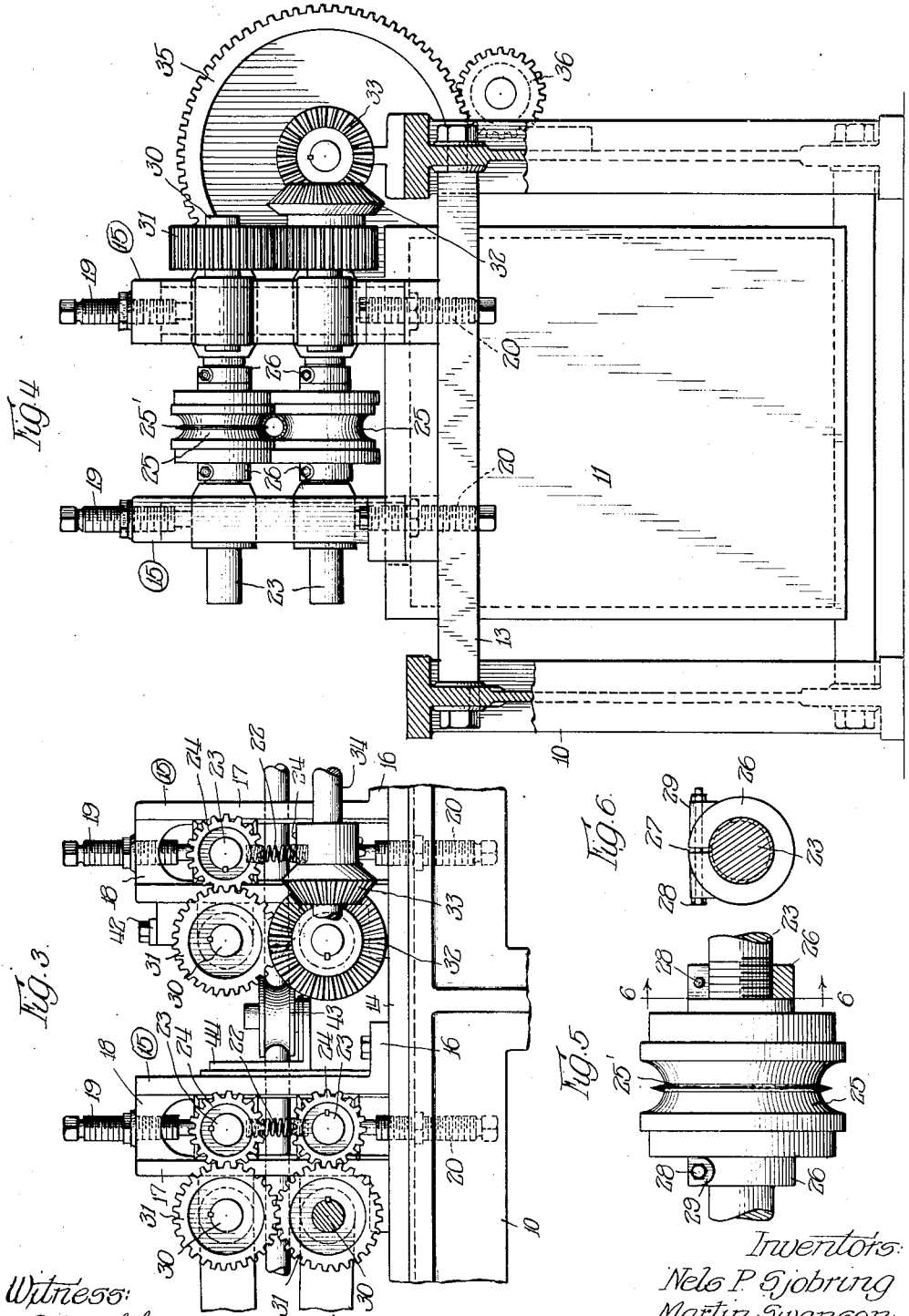

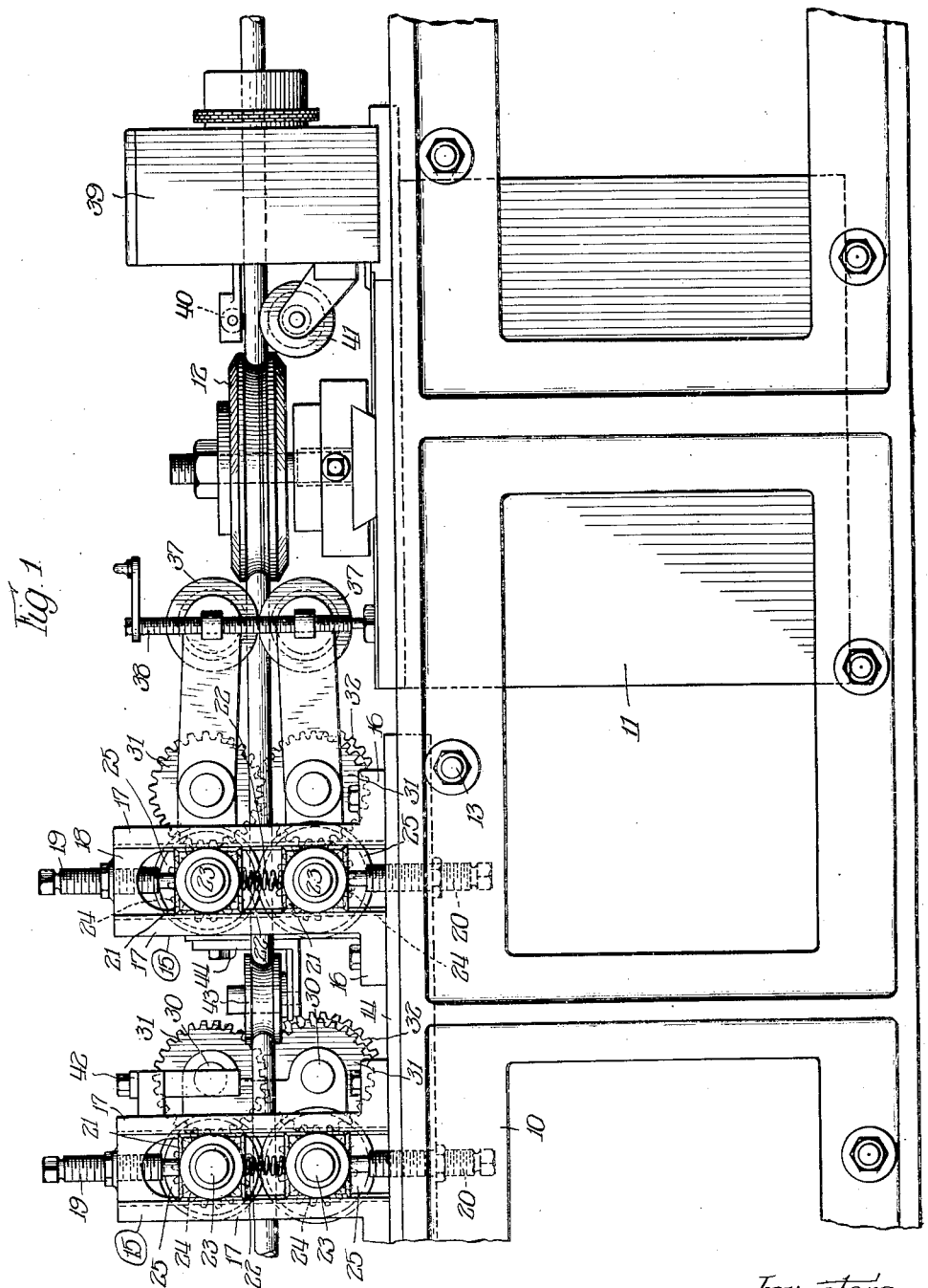

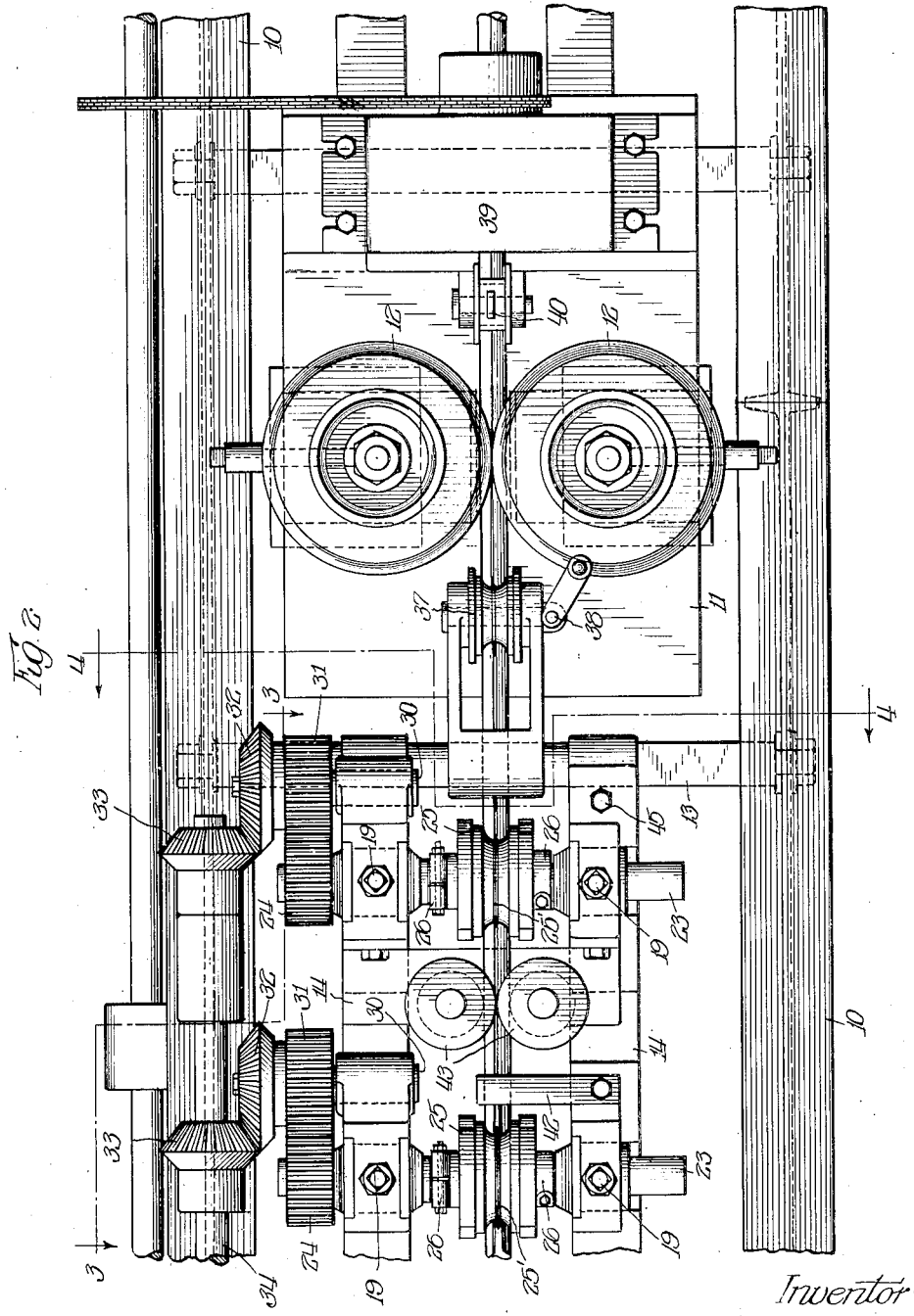

Patented Jan. 19, 1926.

1,570,452

UNITED STATES PATENT OFFICE.

NELS P. SJOBRING AND MARTIN SWANSON, OF MILWAUKEE, WISCONSIN, ASSIGNORS TO GLOBE STEEL TUBES COMPANY, OF MILWAUKEE, WISCONSIN, A CORPORATION OF DELAWARE.

ADJUSTING MEANS FOR ROLLERS.

Application filed February 18, 1924. Serial No. 693,448.

*To all whom it may concern:*

Be it known that we, NELS P. SJOBRING and MARTIN SWANSON, citizens of the United States, residing, respectively, at Milwaukee, in the county of Milwaukee and State of Wisconsin, and at Milwaukee, in the county of Milwaukee and State of Wisconsin, have jointly invented certain new and useful Improvements in Adjusting Means for Rollers, of which the following is a specification.

The present invention relates to adjusting means.

The present invention has been illustrated and will be described in connection with tube welding machines. It is particularly useful in such devices, in which it is desirable to accurately position a metal ribbon in substantially tubular form for presentation to welding electrodes for welding purposes. It has been found in practice, that if accurate and efficient welding is to be performed in a welding machine, adjustment is necessary to compensate for wear. Furthermore, when the size of the member being welded is changed, different forming members are required and it is desirable that said forming members should be properly positioned with a minimum of trouble and in a minimum of time.

An object of the present invention is to provide adjustment means applicable to tube welders by means of which the rollers which shape a metal ribbon into substantially tubular form for presentation to the welding electrodes may be readily adjusted to proper position and securely held in such position.

A further object of the present invention is to provide adjustable mounting means for the forming rollers of a tube welding machine which permit adjustment without requiring dismantling of the machine.

A further object is to provide simple adjustment means applicable to electric tube welders which will allow the line of presentation of the seam to be welded to be readily adjusted.

Further objects will appear as the description proceeds.

Referring to the drawings—

Figure 1 is a view in side elevation of part of a welding machine illustrating a preferred embodiment of the present invention;

Figure 2 is a top plan view of the structure shown in Figure 1;

Figure 3 is a view taken along the plane indicated by the line 3—3 of Figure 2;

Figure 4 is a view taken along the plane indicated by the line 4—4 of Figure 2;

Figure 5 illustrates a detailed construction; and

Figure 6 is a sectional view taken along the plane indicated by the line 6—6 of Figure 5.

Before proceeding with a detailed description of the present invention it will be enlightening to consider same with reference to an electric welding machine for welding a strip of metal into tubular form imperforate throughout its periphery. In the type of machine referred to, a strip of metal, which may be substantially flat upon entering the machine, is gradually formed into substantially tubular form and, when in said substantially tubular form, is passed between welding electrodes which direct a welding current across the edges of said ribbon, which edges form the seam to be welded. In order to perform a good weld, it is essential that the tubularly shaped ribbon be accurately positioned. In order to compensate for wear and to allow different sizes of welding rollers to be used at different times when different sizes of tubing are to be welded, it is very desirable to have some means which permits ready adjustment.

Referring to the drawings for a description of a welding machine and for a detailed description of the present invention, the numeral 10 indicates a base or frame which may have mounted therein the transformer 11. The terminals of the secondary winding of said transformer 11 may be connected to the welding electrodes 12, 12, which in a preferred type of welder take the form of curved rollers shaped to embrace a tubularly formed metal ribbon and are so designed that electric current delivered by said transformer 11 is directed across the seam in said tubularly formed ribbon to weld said seam, whereby said tubularly formed ribbon will present an imperforate periphery.

The ribbon to be welded is ordinarily presented to the welding machine in a flat condition, rollers being provided for shaping said ribbon into tubular form. In order not to subject the ribbon to destructive stresses, said ribbon is ordinarily passed through a series of rollers which gradually shape the flat ribbon into such tubular form.

Figures 1 and 2 show only two pairs of forming rollers, illustration of the others being considered unnecessary for a complete understanding of the present invention.

The numeral 13 represents one of a pair of transversely extending supporting means which may be provided for carrying supports 14, 14 which extend longitudinally of the frame 10. Each of the supports 14, 14 has mounted thereon the vertically extending supporting means 15, 15. Each of the supporting means 15, 15 is of a conformation which may be described as an inverted U having the laterally extending members 16, 16 which may be bolted to the corresponding support 14. Each of the supporting means 15, 15 comprises the side members 17, 17 which said members present bearing surfaces on their inside opposed faces for a purpose which will be referred to. A cross bar 18 of each of the supporting means 15, 15 provides a screw threaded mounting for the adjusting bolt 19. Each support 14 is provided with an adjusting bolt 20. Said adjusting bolts 19 and 20 are provided for the purpose of adjusting the positions of blocks 21, 21, which blocks 21, 21 are slidably mounted upon the opposed bearing surfaces of the side members 17, 17. A spring 22 is provided between the blocks 21, 21, which spring normally biases said blocks to a position away from one another. Blocks 21, 21, slide in grooves in supporting means 15, 15 whereby to be held against movement transversely of said supporting means.

Each of the blocks 21, 21 provides a bearing for a rotatable shaft 23, each of said shafts 23, 23 having rigidly secured thereto a pinion 24. It will be clear that the distance between the pinions 24, 24 will vary as the blocks 21, 21 are varied, but as pointed out hereinafter, this variation will have no detrimental effect in the practical operation of the device.

Each of the shafts 23, 23 carries a forming roller 25. The shape of said forming rollers is not of importance in the description of the present invention but it may be briefly stated that the forming roller on each of the upper shafts 23, 23 will be complementary in shape to the corresponding forming roller on the shaft 23 located below it. The various forming rollers will vary in contour whereby the flat ribbon will be formed from its flat condition into substantially tubular form. Said forming rollers 25 are non-rotatably secured to the rotatable shafts 23, 23 but means are provided for adjusting said forming rollers 25, 25 axially. For this purpose the shafts 23, 23 may be threaded at regions adjacent to the two side faces of the forming rollers 25, 25, which threaded portions receive the adjusting collars 26, 26. As best shown in Figure 6, each adjusting collar 26 is split along a plane extending diametrically of said collar 26. Each collar 26 will be made of resilient metal and enough material will be removed at the split, which is indicated by the numeral 27, to permit a considerable degree of contraction of collar 26. A bolt 28 may be provided having screw threaded engagement with a screw threaded portion 29 of collar 26 by means of which the degree of contraction of collar 26 may be varied as desired. Axial movement of shafts 23, 23 is prevented by any preferred means, as for example, shouldered portions in said shafts having abutting relation with the blocks 21, 21.

It will be clear that by loosening the adjusting collars 26, 26, the gripping effect of said collars upon their corresponding shaft 23 will be released whereby said collars 26, 26 may be rotated to permit adjustment in an axial direction of the corresponding forming roller 25. When the forming roller has been positioned, the adjusting collars may be turned into abutting relation therewith, after which the bolts 28, 28 may be turned to cause the contraction of said collars 26, 26, whereby said forming rollers and collars 26, 26 are securely held in adjusted position.

Mounted laterally of the supporting means 15, 15 are the stub shafts 30, 30, which shafts have non-rotatably secured thereto the gears 31, 31. Said gears 31, 31 mesh with one another and each of said gears meshes with one of the pinions 24, 24. Motion is communicated to the gears 31, 31 through the beveled gears 32, 32, which are non-rotatably mounted upon the shafts 30, 30. Said beveled gears 32, 32 are driven by the cooperating beveled gears 33, 33, which in turn are driven by the shaft 34 which extends longitudinally of the frame 10 and which may derive its movement from the gear 35 driven by the pinion 36. The pinion 36 may be driven by an electric motor or other preferred motive means. The drawings show guiding rollers 37, 37 having their axes arranged along horizontal lines and being held in adjustable position relative to one another by means of the screw threaded shaft 38. Said rollers 37, 37 are located between the forming rollers and the electrodes 12, 12 and serve the purpose of securely holding the tubularly shaped ribbon as it advances to the electrodes 12, 12. Said rollers 37, 37 are swingingly mounted upon any convenient part of the machine, one of the supporting means 15, 15 being utilized for this purpose in the illustrated machine. The two upper rollers 25, 25 illustrated in Figure 2, i. e. the uppermost of the sets of rollers 25, 25 adjacent to the welding rollers 12, 12, are provided with guiding fins 25', 25' and the uppermost of the guiding rollers 37, 37 is provided with a guiding fin 37' for properly shaping and positioning the edges of the tubularly formed ribbon for presentation to the welding electrodes. After the welded tubing has passed the electrodes 12, 12 in the illustrated machine, said tubing is subjected to a hammering operation, which hammering operation is performed by a member indicated as a whole by the numeral 39, which communicates a series of blows to the welded seam by striking said seam with the hammer 40. The numeral 41 indicates an anvil underlying the tubing. A mandrel is provided within the tubing, being supported upon the bracket 42 (Fig. 2). Between the two supporting means 15, 15, illustrated in Figures 1, 2 and 3, are a pair of holding rollers 43, 43 which may be rotatably supported by means of brackets 44, 44 mounted upon any convenient part of the machine, one of the supporting means 15 being utilized for this purpose in the illustrated machine.

As shown in Figure 2, the supports 14, 14 are slidably mounted upon the rods 13, 13 (only one of said rods 13, 13 being illustrated) and, for the purpose of securely holding said supports against movement transversely of the machine, said supports may be rigidly held in gripping relation upon the rods 13, 13 by means of bolts 45, 45, only one of which is illustrated. It will be seen that adjustment of the supports 14, 14 laterally of the mechanism may be had by manipulation of the bolts 45, 45, said bolts being tightened up when the supports 14, 14 are at their proper positions.

The mode of operation of the above described invention will be clear without detailed description. It may be stated, however, that when a predetermined size of tube is to be welded, forming rollers 25, 25 will be chosen which will form the flat ribbon into the desired tubular form. The supports 14, 14 may be adjusted transversely of the machine to accommodate any variation in the distance between supports 14, 14 which may be necessary due to variations in the axial dimensions of the forming rollers. The blocks 21, 21 will be held in the supporting means 15, 15 against movement axially of the shafts 23, 23 and said shafts 23, 23 will have abutting relation with said blocks 21, 21 whereby said shafts 23, 23 will be held against axial movement. Adjustment transversely of the machine of the welding rollers 25, 25 may be readily accomplished by manipulation of the bolts 28, 28 of the adjustment collars 26, 26 whereby the forming rollers may be moved along their axes as desired, after which said collars 26, 26 may be tightened up to prevent further axial movement of said forming rollers 25, 25. When it is necessary to adjust the vertical positions of the cooperating rollers, this may be accomplished by manipulation of the adjusting bolts 19 and 20, the springs 22 permitting adjustment of the distance between the axes of cooperating forming rollers. The blocks 21, 21 will have a movement in a vertical direction and by reason of this fact the adjustment of pinions 24, 24 will be in a vertical direction rather than in a circumferential direction around the axes of rotation of the cooperating gears 31, 31. Though this arrangement departs from the theoretical arrangement for proper meshing of the gearing, it has been demonstrated in commercial operation that the departure is so small as to be negligible. By reason of the described structure, therefore, the necessary adjustment in a vertical direction of the forming rollers 25, 25 is had without the provision of a complicated structure and without sacrificing any practical operation of the gears and pinions which drive said forming rollers.

It will be seen, therefore, that the present invention provides readily operable means for adjusting the positions of the supports 14, 14 and for procuring a fine adjustment of the axial positions of the forming rollers 25, 25 while permitting the ready adjustment of said forming rollers in a vertical direction. Said advantages of adjustability are secured in a device free from complications and which possesses a maximum of sturdiness.

Though a preferred embodiment of the present invention has been described in detail, many modifications will occur to those skilled in the art. It is intended in this patent to cover all such modifications that fall within the scope of the appended claims.

We claim:

1. In wielding mechanism, in combination, an elongated frame, transversely extending supporting means mounted in said frame, longitudinally extending supporting members carried by said transverse supporting means and adjustable transversely of said frame, a vertical supporting member mounted upon each of said longitudinally extending supporting members, a pair of bearing blocks carried by each of said vertical supporting members and a shaft rotatably supported by one block of said vertical supporting members and one block of the other of said vertical supporting members and a second shaft rotatably carried by the other blocks of said vertical supporting members, a pinion mounted upon each of said shafts for communicating motion thereto, a pair of gear wheels meshing with one another, each of said gear wheels meshing with one of said pinions, means for communicating motion to said gear wheels and means for adjusting the vertical positions of said shafts.

2. In welding mechanism, in combination, an elongated frame, transversely extending supporting means mounted in said frame, longitudinally extending supporting members carried by said transverse supporting means and adjustable transversely of said frame, a vertical supporting member mounted upon each of said longitudinally extending supporting members, a pair of bearing blocks carried by each of said vertical supporting members and a shaft rotatably supported by one block of said vertical supporting members and one block of the other of said vertical supporting members and a second shaft rotatably carried by the other blocks of said vertical supporting members, a pinion mounted upon each of said shafts for communicating motion thereto, a pair of gear wheels meshing with one another, each of said gear wheels meshing with one of said pinions, means for communicating motion to said gear wheels and means for adjusting the vertical positions of said shafts, each of said shafts being provided with a forming roller between said vertical supporting members, each of said shafts having a screw threaded portion adjacent to the two side faces of its corresponding forming roller and adjustable collars for holding said forming rollers at desired positions longitudinally of said shafts.

3. In welding mechanism, in combination, an elongated frame, transversely extending supporting means carried by said frame, longitudinally extending supporting members carried by said transversely extending supporting means, said longitudinally extending supporting members being adjustable transversely of said frame, vertically extending supporting members, blocks slidably supported for vertical movement by said vertically extending supporting members, rotatable shafts carried by said blocks, resilient means for holding said blocks apart from one another and screw threaded adjusting means for said blocks operating in opposition to said resilient means.

4. In welding mechanism, in combination, an elongated frame, supporting members extending longitudinally of said frame and adjustably mounted transversely thereof, vertically extending supporting members, said vertically extending supporting members having vertically slidable bearing members, and a pair of transversely extending parallel shafts carried by said bearing members, relatively stationary bearing members carried by said vertically extending supporting members, a stub shaft carried by each of said relatively stationary bearing members and gears carried by said first mentioned shafts and by said stub shafts, and means for adjusting the position between said first mentioned shafts without altering the positions of said stub shafts.

5. In welding mechanism, in combination, an elongated frame, supporting members extending longitudinally of said frame and adjustably mounted transversely thereof, vertically extending supporting members mounted upon said longitudinally extending supporting members and having vertically slidable bearing members, and a pair of transversely extending parallel shafts carried by said bearing members, relatively stationary bearing members carried by said vertically extending supporting members, a stub shaft carried by each of said relatively stationary bearing members and gears carried by said first mentioned shafts and by said stub shafts, and means for adjusting the position between said first mentioned shafts without altering the positions of said stub shafts, each of said first mentioned shafts being provided with forming rollers and means for adjusting the positions of said forming rollers longitudinally of said first mentioned shafts.

Signed at Milwaukee, Wisconsin, this 12th day of February, 1924.

NELS P. SJOBRING.
MARTIN SWANSON.